US007246348B1

(12) United States Patent
Mixer, Jr.

(10) Patent No.: US 7,246,348 B1
(45) Date of Patent: Jul. 17, 2007

(54) METHOD AND APPARATUS FOR USING PRINT JOBS FOR DOWNLOADING AND EXECUTING PRINTER CONTROLLER CODE

(75) Inventor: J. Bruce Mixer, Jr., Longmont, CO (US)

(73) Assignee: International Business Machines Corp., Armonk, NY (US)

( * ) Notice: Subject to any disclaimer, the term of this patent is extended or adjusted under 35 U.S.C. 154(b) by 432 days.

(21) Appl. No.: 09/688,268

(22) Filed: Oct. 13, 2000

(51) Int. Cl.
*G06F 9/44* (2006.01)
*G06F 15/177* (2006.01)
*G06F 3/00* (2006.01)
*G06F 13/12* (2006.01)

(52) U.S. Cl. .................... 717/168; 717/174; 710/8; 710/62; 713/2; 358/1.16

(58) Field of Classification Search ........ 717/168–178; 710/8, 62, 64, 72; 709/221–222; 358/1.15; 713/2, 10
See application file for complete search history.

(56) References Cited

U.S. PATENT DOCUMENTS

| 4,095,277 | A | * | 6/1978 | Bluethman et al. ............ 710/5 |
| 4,174,536 | A | * | 11/1979 | Misunas et al. ............... 710/1 |
| 4,868,866 | A | * | 9/1989 | Williams, Jr. ................. 707/9 |
| 5,206,735 | A | * | 4/1993 | Gauronski et al. .......... 358/296 |
| 5,436,730 | A | * | 7/1995 | Hube ........................... 358/401 |
| 5,586,241 | A | * | 12/1996 | Bauermeister et al. ...... 345/467 |
| 5,623,604 | A | * | 4/1997 | Russell et al. ............... 717/167 |
| 5,633,932 | A | * | 5/1997 | Davis et al. ................. 713/176 |
| 5,649,112 | A | * | 7/1997 | Yeager et al. ................ 709/220 |
| 5,659,801 | A | * | 8/1997 | Kopsaftis ..................... 710/62 |
| 5,748,877 | A | | 5/1998 | Dollahite et al. |
| 5,768,495 | A | | 6/1998 | Campbell et al. |
| 5,815,722 | A | * | 9/1998 | Kalwitz et al. ............. 717/178 |
| 5,991,402 | A | * | 11/1999 | Jia et al. ....................... 705/59 |
| 6,038,636 | A | * | 3/2000 | Brown et al. ................ 711/103 |
| 6,467,087 | B1 | * | 10/2002 | Yang .......................... 717/168 |
| 6,498,657 | B1 | * | 12/2002 | Kuntz et al. ................ 358/1.15 |
| 6,523,083 | B1 | * | 2/2003 | Lin et al. ..................... 711/103 |
| 6,559,965 | B1 | * | 5/2003 | Simpson et al. ........... 358/1.15 |
| 6,567,176 | B1 | * | 5/2003 | Jeyachandran et al. .... 358/1.14 |

(Continued)

FOREIGN PATENT DOCUMENTS

JP 2000059545 A * 2/2000

OTHER PUBLICATIONS

John R. Levine, "Linkers and Loaders", Oct. 1999, Morgan-Kaufmann Publishers, ISBN 1-55860-496-0.*
Denis Tom, "QMS 2060 EX, 2425 Turbo EX", May 26, 1998, PC Magazine, vol. 17, No. 10, p. 154.*

(Continued)

*Primary Examiner*—Tuan Dam
*Assistant Examiner*—J. Derek Rutten
(74) *Attorney, Agent, or Firm*—Duft, Bornsen & Fishman, LLP (57) ABSTRACT

A method for updating microcode of a printer includes the steps of embedding a microcode update file as a module in a print job file, inputting the print job file to the printer, recognizing that the print job file includes the microcode update file, and writing the microcode update file to a memory area in the printer indicated in the print job file. The microcode update file may include an executable program and after writing the microcode update file to memory execution may be transferred to the executable program.

2 Claims, 8 Drawing Sheets

U.S. PATENT DOCUMENTS

| | | | | |
|---|---|---|---|---|
| 6,603,864 | B1* | 8/2003 | Matsunoshita | 382/100 |
| 6,604,111 | B1* | 8/2003 | Hamzy | 358/1.9 |
| 6,714,949 | B1* | 3/2004 | Frey, Jr. | 707/200 |
| 6,930,785 | B1* | 8/2005 | Weyand et al. | 358/1.1 |
| 2003/0051046 | A1* | 3/2003 | Parry | 709/236 |
| 2003/0217124 | A1* | 11/2003 | Parry | 709/220 |
| 2004/0054762 | A1* | 3/2004 | Parry et al. | 709/221 |
| 2004/0120001 | A1* | 6/2004 | Boldon | 358/1.15 |

OTHER PUBLICATIONS

Technical Reference Manual, "Multi-protocol LAN Printer Interface", Date unavailable, acessed Aug. 30, 2005 at <www.direktronik.se/prod/m21-1428.pdf>, Chapter 13.*

Allen Braunsdorf, "PostScript: Answers to Questions", Web site archived at <http://web.archive.org/web/19990902000548/http://postscript.org/FAQs/language/FAQ.html>, latest archival date is Oct. 9, 1999, Accessed and printed on Mar. 29, 2006, assorted pp. 1-8.*

* cited by examiner

Note: in the format listed below:
<UEL> is <ESC>%-12345X
<ESC> is 0x1b
<SOH> is 0x01
<STX> is 0x02
<ETX> is 0x03

| Byte Count | Bytes | Contents | Description |
|---|---|---|---|
| 9 | 0 – 8 | <UEL> | User Exit Language |
| 7 | 9 – 15 | <ESC><SOH><STX>CODE | Lead-in (Note the word "CODE") |
| 19 | 16 – 34 | ASCII 19 chars including NULL | Version |
| 4 | 35 – 38 | UINT32 XXXX | Number of modules (hex fmt) |
| 1 | 39 | INT8 X | Destination Printer: (hex fmt) 00: Don't Care which Printer 01: Diamond Printer 02: Puma Printer |
| 2 | 40 – 41 | INT16 XX | Minimum Memory Needed (in MB) |
| 81 | 42 – 122 | ASCII 81 chars including NULL | Status Page Descriptor – Upper |
| 81 | 123 – 203 | ASCII 81 chars including NULL | Status Page Descriptor – Lower |
| 31 | 204 – 234 | ASCII 31 chars including NULL | File Content |
| 8 | 235 – 242 | 123456789ABCDEF123 | Printer Signature |
| 4 | 243 – 246 | UINT32 XXXX | Header Checksum (hex fmt) |
| 1 | 247 | ASCII 'S' to suppress | Suppress Status Page |
| 1 | 248 | INT8 | Download and execute first module Bit 0 0 - Not active, ignore all other bits 1 – Download and execute the first module Bit 1 0 – Current code downloads the rest of the file. 1 – Let the new executable download the rest of the file Bit 2-7 Unused |
| 7 | 249 – 254 | | Optional Data – Unused |
| 1 | 255 | <ETX> | Lead-out |

| Byte Count | Bytes | Contents | Description | |
|---|---|---|---|---|
| 6 | 0-5 | MODULE | Tag (the word "MODULE") | 210 |
| 31 | 6-36 | ASCII 31 chars including NULL | Module Name | 215 |
| 19 | 37-55 | ASCII 19 chars including NULL | Version | 220 |
| 4 | 56-59 | UINT32 | Date in Seconds from 1/1/1970 | 225 |
| 41 | 60-100 | ASCII 41 chars including NULL | Target Location Path | 230 |
| 1 | 101 | INT8 X | Bit Flags (hex fmt)<br>0x01 Uncompress the module (gzip)<br>0x02 Create File<br>0x04 Delete File<br>0x08 Create Directory<br>0x10 Delete Directory<br>0x20 CX/TX NIC Code<br>...TBD | 235 |
| 4 | 102-105 | UINT32 XXXX | Total Bytes of data after module header (hex fmt) | 240 |
| 4 | 106-109 | UINT32 XXXX | Checksum (hex fmt) | 245 |
| 18 | 110-127 | | Optional Data – Unused | 250 |

METHOD AND APPARATUS FOR USING PRINT JOBS FOR DOWNLOADING AND EXECUTING PRINTER CONTROLLER CODE

FIELD OF THE INVENTION

This invention pertains to downloading program code to a device through an interface to replace or add to present microcode.

BACKGROUND OF THE INVENTION

As electronic devices have become more sophisticated, they now typically include computing components such as a processor, volatile memory, non-volatile memory and at least one interface to other components of the device. Microcode for directing the activity of the processor is usually resident in the non-volatile memory, and is typically loaded into the volatile memory and executed by the processor to perform various activities and operations. Computer peripherals, such as serial ports, USB hubs, modems, disk drives, network interface cards, and printers are especially suited for these types of components.

Supporting computer peripherals in the field, especially printers, can be difficult because, in many cases, specialized routines must be loaded into the printer in order to diagnose problems.

Reference in this regard may be had to U.S. Pat. No. 5,768,495, entitled "Method and Apparatus for Printer Diagnostics," by Campbell et al., issued Jun. 16, 1998.

Supporting the microcode of a printer at a customer site is also a difficult process because, more often than not, diagnosing and correction of microcode problems requires a customer engineer to be physically present at the printer. This is a disadvantage in that it results in a higher support cost because of travel time, availability of tools, etc. In order to install new microcode, the new microcode must be downloaded into the non-volatile memory of the device. This may require a special hardware and/or software interface. In most cases, the operating system of the computer controlling the printer controls all access to the printer and only provides a user with operations related to the function of the device, for example, printing. In this example, the computer would provide no facility to download anything other than print jobs to the printer. When the operating system permits no other access, a special application running under the operating system may be required to download new program code. Utilizing such an application involves obtaining the application, installing the application, and invoking the application in order to perform the installation.

To further complicate matters, the operating system may not relinquish control of the printer to the application and may have to be disabled or shut down in order to run the application for performing such a download.

Other techniques include embedding a special code within a data field of a known control code for the particular peripheral. The data field and the special code may be chosen such that the possibility of the special code being used as actual data in that data field is extremely low. Upon recognizing the control code coupled with the special code in the data field, the peripheral waits for a specific second command. If the specific second command is received the peripheral loads the data attached to that subsequent command as new microcode, and reboots.

Reference in this regard may be had to U.S. Pat. No. 5,659,801, entitled, "Method and Apparatus for Replacing Resident Peripheral Device Control Microcode by Download via an Application Program," by W. Kopsaftis, issued Aug. 19, 1997.

OBJECTS AND ADVANTAGES OF THE INVENTION

It is a first object and advantage of this invention to provide a method and apparatus for downloading microcode to a device without requiring the use of specialized downloading hardware or application routines.

It is a further object and advantage of this invention to download microcode to a device by delivering it in a format that the device is already adapted to receive.

It is still further an object and advantage of this invention to download microcode to a device by downloading an executable program to the device in a format that the device is already adapted to receive, and then running the executable program.

SUMMARY OF THE INVENTION

The foregoing and other problems are overcome and the objects of the invention are realized by methods and apparatus in accordance with embodiments of this invention.

A method for updating microcode of a printer is disclosed which includes the steps of embedding a microcode update file as a module in a print job file, inputting the print job file to the printer, recognizing that the print job file includes the microcode update file, and writing the microcode update file to a memory area in the printer indicated in the print job file. The microcode update file may include an executable program and after writing the microcode update file to memory execution may be transferred to the executable program.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
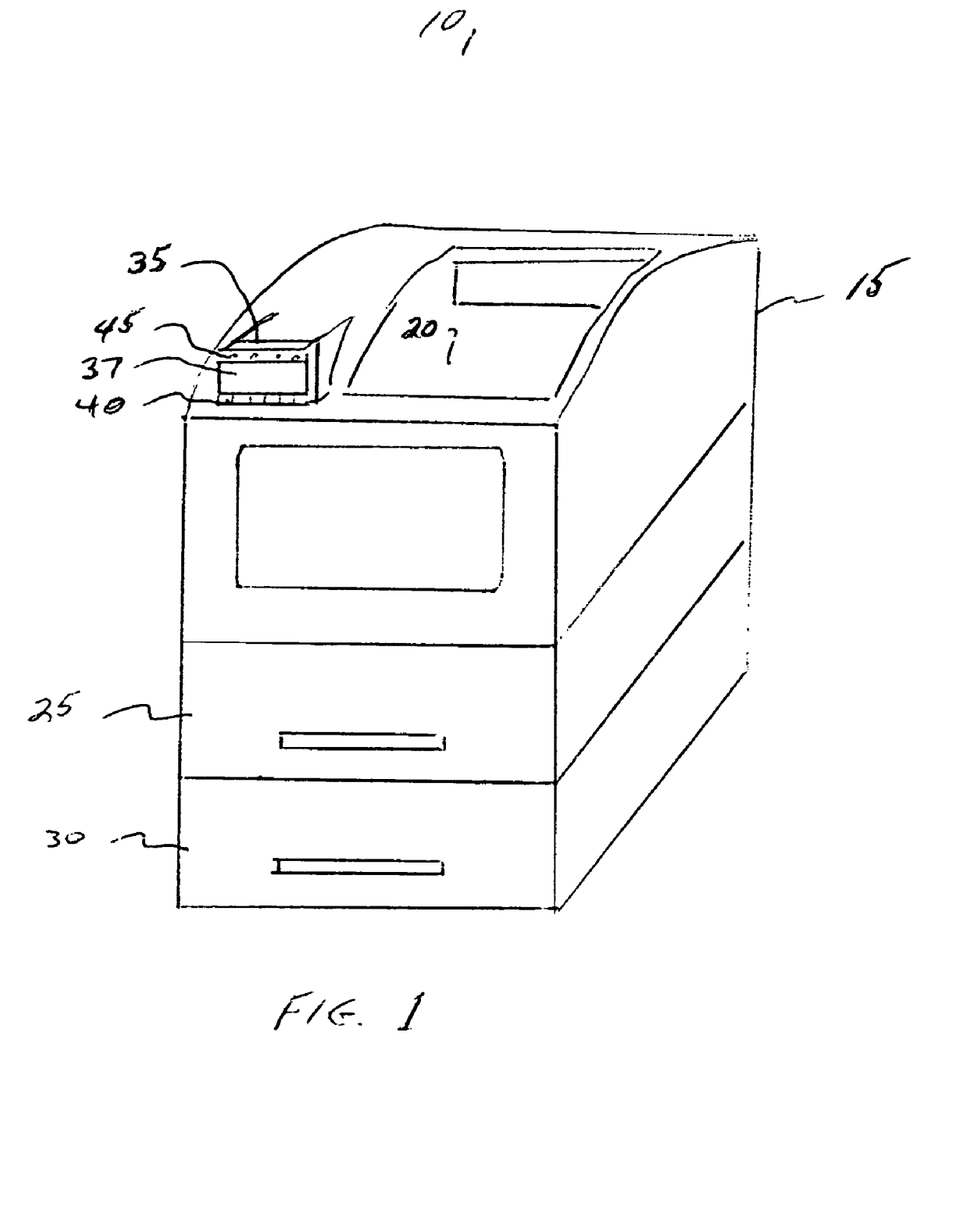
FIG. 1 is block diagram of a printer in accordance with the teachings herein.

FIG. 1 shows a diagram of a printer 10 in accordance with the teachings of this invention. The printer includes an enclosure 15, an output tray 20, media trays 25, 30 for holding a quantity of media to be printed upon, a front panel 35, including a display 37 and controls 40 for operating the printer. The front panel 35 typically includes status indicators 45 for indicating the status of the various processes within the printer 10.

Figure 2:
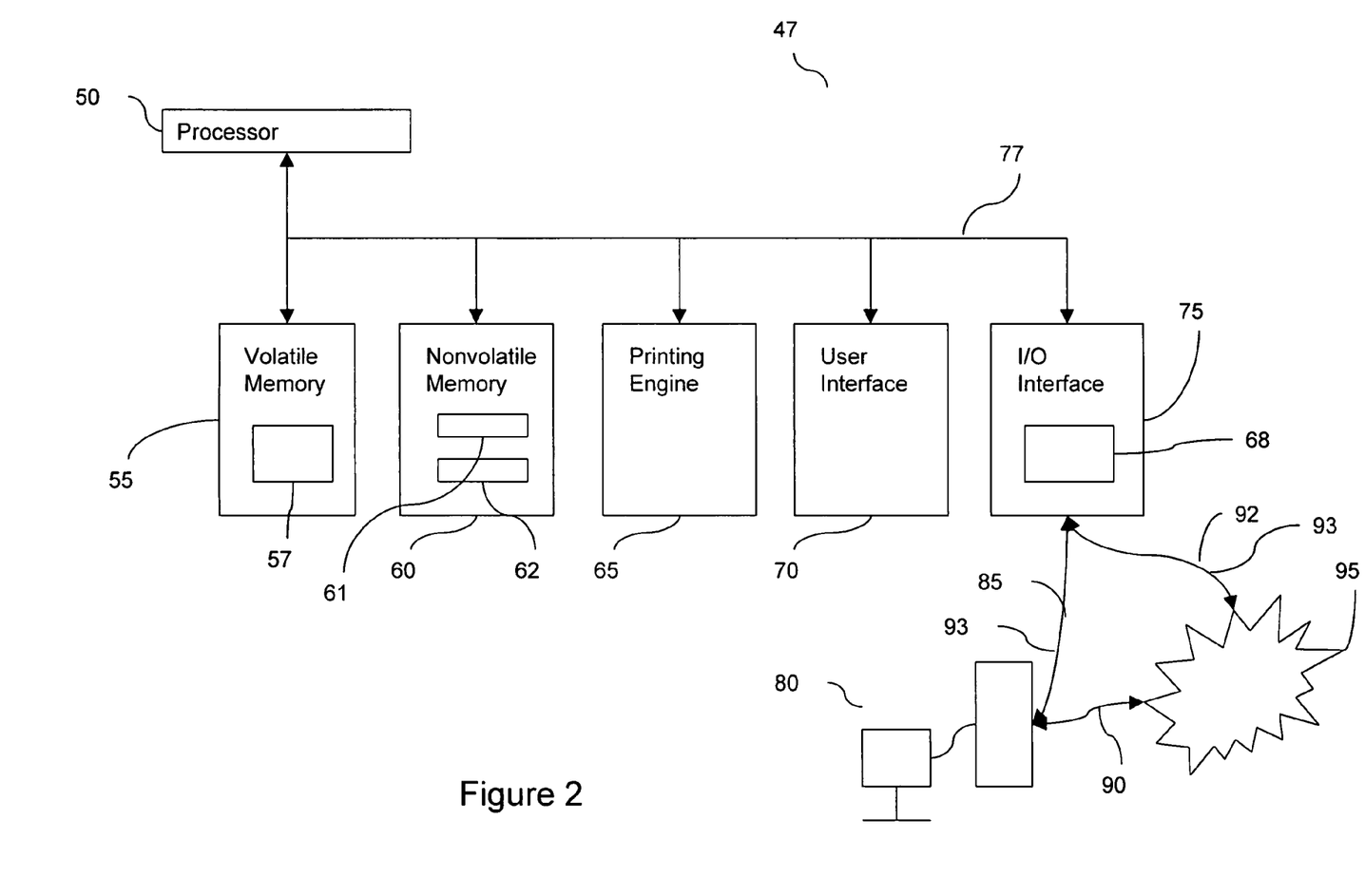
FIG. 2 is a block diagram of the system architecture of the printer shown in FIG. 1.

FIG. 2 shows a schematic diagram of the system architecture 47 of the printer 10. The printer 10 includes a processor 50 for controlling the operation of the printer, and volatile memory 55 and non-volatile memory 60 for storing programs. The printer 10 preferably also includes a printing engine 65, a user interface 70 for receiving user inputs and for displaying messages and status to a user, and an input output (I/O) interface 75 for receiving print job files. The I/O interface 75 is also capable of receiving, through links 85 or 92, a computer readable medium embodied in a carrier wave of a propagated signal, 93, such as an internet transmission, where the computer readable medium carries one or more instructions for the processor 50. The processor 50, volatile memory 55, non-volatile memory 60, printing engine 65, user interface 70, and I/O interface 75 all communicate through bus 77.

The volatile memory 55 includes memory for executing programs, referred to herein as execution memory 57.

Figure 3:
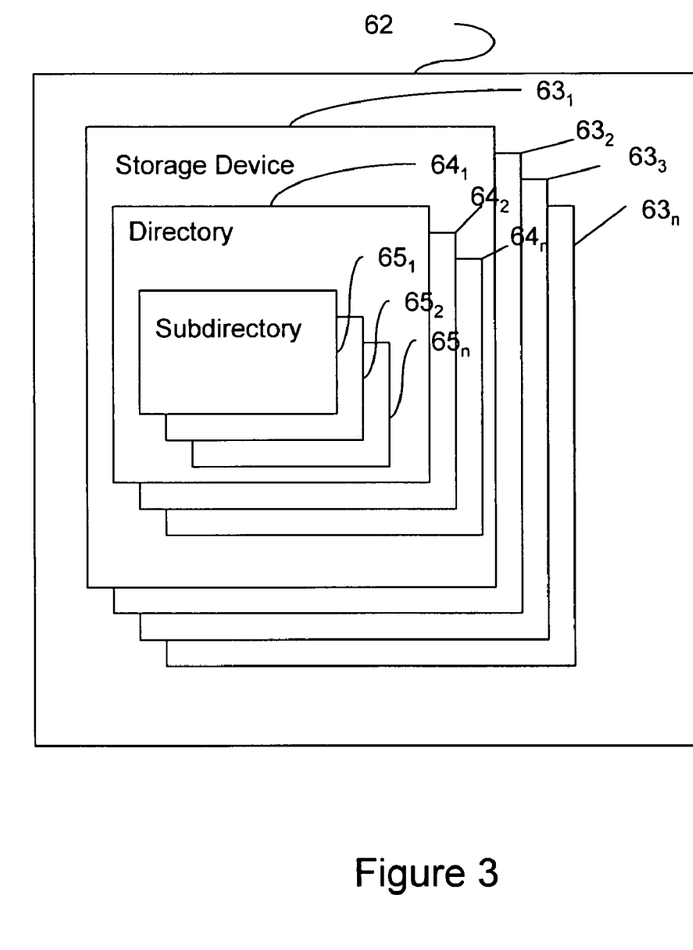
FIG. 3 shows a block diagram of a portion of the system non-volatile memory implemented as one or more storage devices.

The non-volatile memory 60 may have a portion configured as a boot ROM 61. Referring also to FIG. 3, the non-volatile memory 60 preferably includes memory 62 implemented as one or more storage devices $63_1 \ldots 63_n$. The storage devices $63_1 \ldots 63_n$ may include reprogrammable memory devices such as EPROM, EEPROM, compact flash memory, etc. The storage devices $63_1 \ldots 63_n$ may further include one or more hard drives or other types of storage media. The non-volatile memory may also be distributed throughout other parts of the system. For example, a portion of the non-volatile memory may include flash memory 67 resident on the I/O interface 70. As mentioned above, the non-volatile memory 60 includes programs, and in particular includes microcode for directing the activities of the processor, including receiving a print job file through the I/O interface 75 and for utilizing the information in the print job file to direct the printing engine.

For purposes of this invention, microcode includes the following: CTL code, that is, printer control code which includes routines called by the operating system for accessing and controlling the interaction between the various components of the printer 10; IPDS code, a higher level printer language code for directing the printer engine; flash resource code, that is any code to be stored in flash memory; and, hard disk resource code, that is, any code to be stored on a hard disk. Microcode may also include; twinax NIC code which is code to be stored in non-volatile memory 68 of I/O Interface 75 (FIG. 2) when the I/O Interface 75 is what is commonly referred to as a twinaxial network interface card; and, coax NIC code which is code to be stored in non-volatile memory 68 of I/O Interface 75 (FIG. 2) when the I/O Interface 75 is what is commonly referred to as a coaxial network interface card. In addition, microcode may further include operating system code, code that provides special features for the printer 10, web pages that may be present in the printer 10, as well as data files such as fonts.

As shown in FIG. 3, each storage device $63_1 \ldots 63_n$ may include a hierarchical file structure comprising one or more directories $64_1 \ldots 64_n$, each capable of containing one or more subdirectories $65_1 \ldots 65_n$.

Returning to FIG. 2, an external computing device 80 may be connected to the printer 10 through the I/O interface 75 either by way of a link 85, or by way of a links 90, 92 and a network 95. The network 95 may include the PSTN, the internet, a wireless network, a wired network, and may further include other types of networks including X.25, TCP/IP, ATM, etc., as long as the network is suitable for conveying information to said printer 10. The computing device 80 preferably includes the capability to generate print job files to update microcode in printer 10, and may further include the ability to generate print job files to be printed. The I/O interface 70 may include a network interface, a serial or parallel interface, or any other type of interface, which is suitable for conveying information to be printed to the printer 10. This information is delivered in a particular format known as a print job file 97 (FIG. 4).

In accordance with the teachings of this invention a print job file may also include new microcode, also referred to as a microcode update, for updating or extending the current microcode in the non-volatile memory 60. The current microcode in the non-volatile memory 60 is assumed to include routines for receiving a print job file 97 into volatile memory 55, recognizing the print job file 97 as including a microcode update, and then performing operations based on information in the microcode update.

Figure 4:
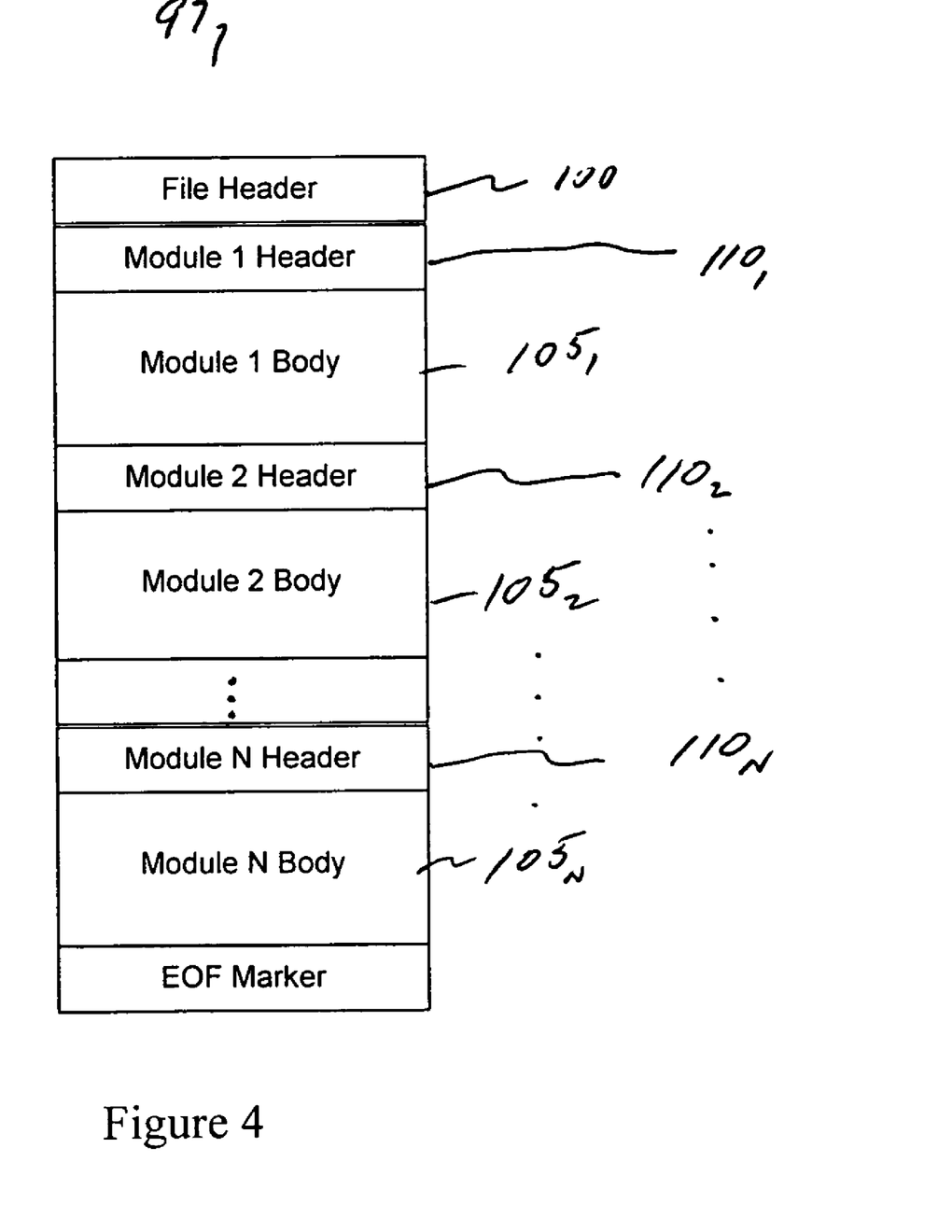
FIG. 4 shows a diagram of the structure of a print job file for downloading a microcode update file in accordance with these teachings.

FIG. 4 shows a diagram of the structure of the print job file 97 in accordance with the teachings of the invention. The file header 100 includes information indicating that the file 97 includes program code. The print job file 97 also includes one or more modules $105_1$–$105_n$ which include the microcode update. Each module $105_1$–$105_n$ has a corresponding module header $110_1$–$110_n$ which contains additional information about the particular module, including a destination storage device 63 and directory 64 within non-volatile memory 60, that is, the additional information designates a location within non-volatile memory 60 for storing the module upon downloading.

Figure 5:
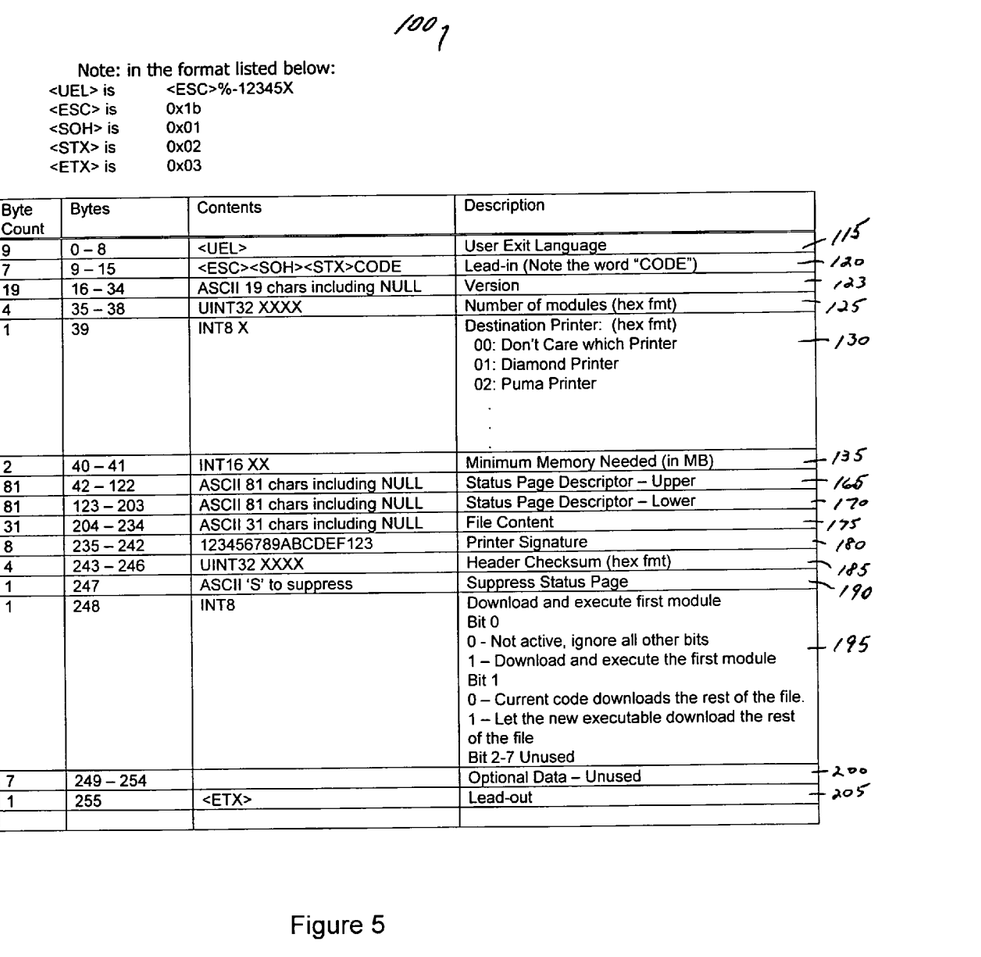
FIG. 5 shows a diagram of the file header of the print job file for downloading a microcode update.

FIG. 5 shows a diagram of a presently preferred embodiment of the file header 100 for the print job file 97. The first nine bytes 115 of the file header 100 include a known indicator of the start of the print job file known as "User Exit Language." The next seven bytes 120 are known as lead-in and include three hexadecimal characters and the four letters "C", "O", "D", and "E". Upon identifying the first 16 bytes as having this particular structure, the processor recognizes that a microcode update file is included in the print job file 97, invokes a program or task to control updating the microcode and passes the print job file content to that task. The next nineteen bytes 123, that is, bytes 16–34 of the file header 100, include the version of the microcode update file being downloaded. Bytes 35–38, designated 125 in FIG. 5, include the number of modules in the print job file 97. The next byte 130 contains an identifier for the printer that the microcode update file is designed for. Bytes 40–41 (135) include an indicator of the memory size required for the print job file 97.

Still referring to FIG. 5, the file header 100, in bytes 42–122 (165) includes 81 ASCII characters for the upper status page descriptor 145 (FIG. 6), and in bytes 123–203 (170) includes 81 ASCII characters for the lower status page descriptor 160. The next 31 bytes 175 of the file header 100 include a description of the type of microcode included in the microcode update. The types of acceptable descriptions include the types of microcode described above, that is, CTL code, IPDS code, flash resource code, hard disk resource code, twinax NIC code, and coax NIC code. The following eight bytes 180, that is, bytes 235 to 242, include a random signature number for identification of the microcode update. Bytes 243–246 (185) include a checksum of all previous bytes in the file header 1100. Byte 247 (190) designates suppressing printing of a status page previously discussed if an ASCII "S" is present in the byte.

Figure 6:
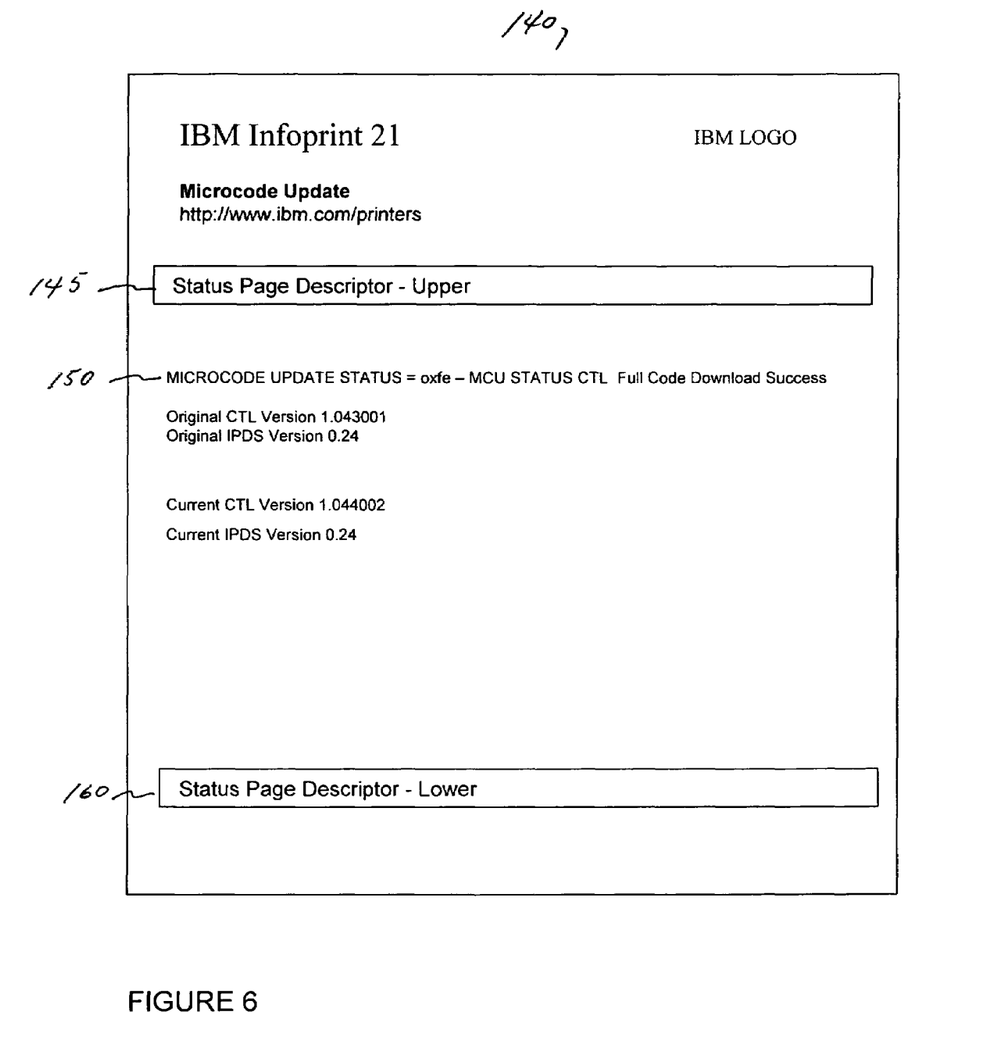
FIG. 6 shows a status page, printed as a result of a microcode update.

When a microcode update file has been downloaded and processed, as will be explained below, the processor 50 may cause a status page 140 to be printed as shown in FIG. 6. The status page 140 includes an upper status page descriptor 145, the status of the update operation 150, the original versions of certain portions of the microcode 155, the current (after updating) versions of those certain portions of the microcode, and a lower status page descriptor 160.

When a microcode update file has been downloaded and processed, as will be explained below, the processor 50 may cause a status page 140 to be printed as shown in FIG. 6. The status page 140 includes an upper status page descriptor 145, the status of the update operation 150, the original versions of certain portions of the microcode 155, the current (after updating) versions of those certain portions of the microcode, and a lower status page descriptor 160.

Returning to FIG. 5, byte 248 (195) of the file header 100 includes bits according to the teachings of the invention that indicate how the print job file 97 including the microcode update, will be processed. The operation of these bits will be described in detail below.

Bytes 249 through 254 (200) may include optional data, and byte 255(205) is a lead out string indicating the end of the file header 100.

Figure 7:
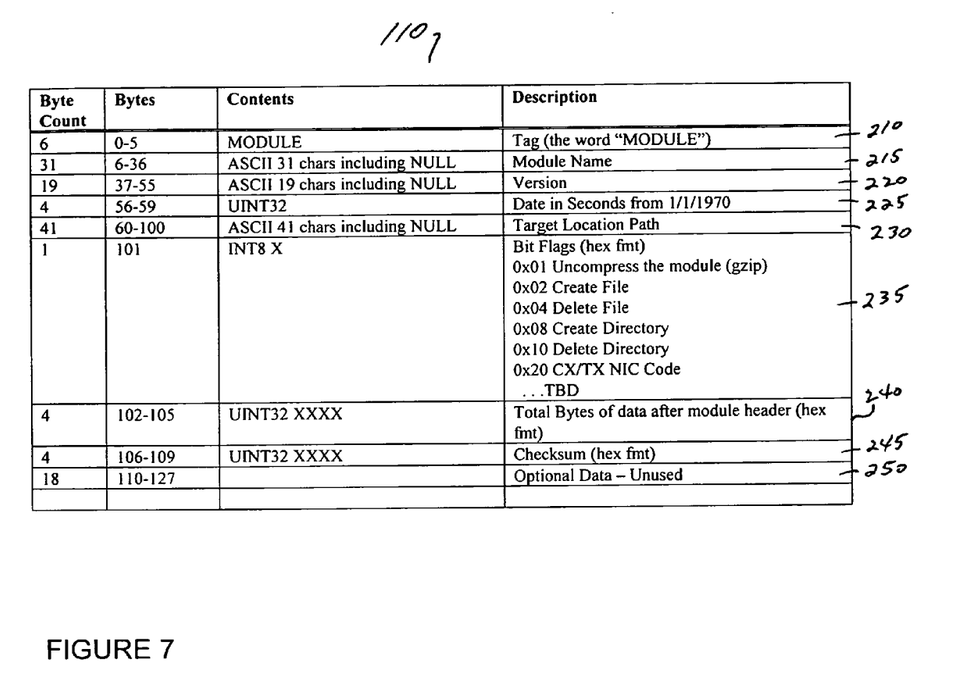
FIG. 7 shows a diagram of the module header of a module within a microcode update.

Each individual module includes its own header 110, as shown in FIG. 7. The first six bytes 210 of the module header 110 include the word "MODULE," designating that this portion of the print job file 97 is a module. The next 31 bytes 215, that is, bytes 6–36, include the name of the module in ASCII (with no path information). Bytes 37–55 (220) include the version of the module, also in ASCII. The following four bytes 225 indicate the date the module was released, formatted in seconds from Jan. 1, 1970. Bytes 60–100 (230) specify the target location path, that is, the storage device 63, directory 64, and subdirectory 65 (if applicable) in non-volatile memory 60 where the module is to be stored. Byte 101 (235) includes bit flags that define various operations to be performed in conjunction with the particular module. A bit flag of 01 hex directs the current microcode to uncompress the module. A bit flag of 02 hex directs the current microcode to create a file using the target location path 230 as the path and filename. A bit flag of 04 hex directs the current microcode to delete the file found at the target location path 230. A bit flag of 08 hex directs the current microcode to create a directory using the target location path 230. A bit flag of 10 hex directs the current microcode to delete the directory found at the target location path 230. A bit flag of 20 hex directs the current microcode to deposit the corresponding module body 105 at a default location, known to the system, in non-volatile memory 68 of the I/O interface 75, when the I/O interface is a coaxial or triaxial network interface card.

Bytes 102–105 (240) of the module header 110 include the total number of bytes that the module encompasses, excluding the module header 110. The following four bytes 245 indicate a checksum for the module. The checksum is preferably calculated as a 16 bit truncated sum of module header bytes 0–105, plus the sum of the bytes of the module body 105. Bytes 110–127 (250) are for optional data.

Figure 8:
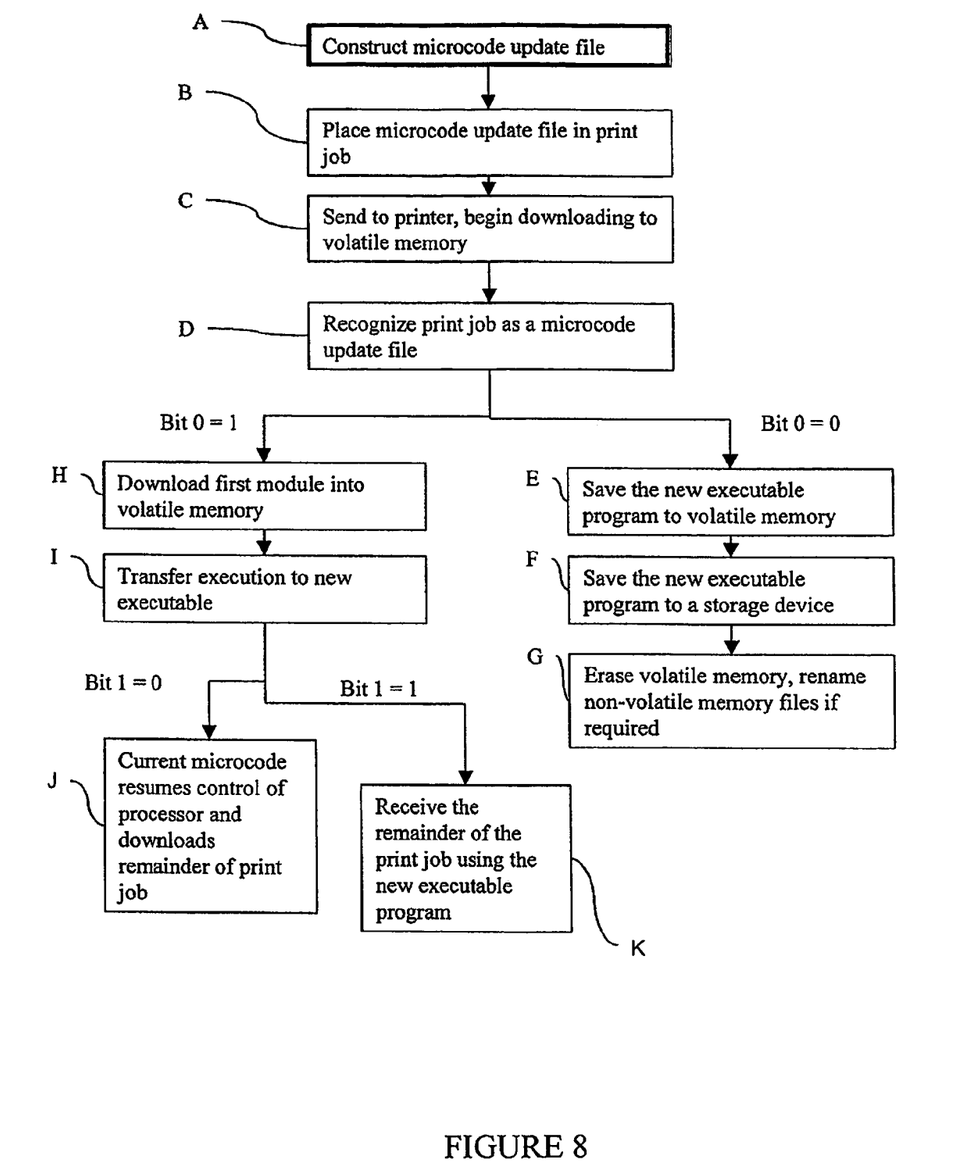
FIG. 8 shows a flow chart of the steps for preparing, downloading and utilizing a microcode update.

Turning now to FIG. 8, the steps for utilizing the invention are as follows: In step A a microcode update file in accordance with the teachings of the invention is constructed, preferably on computing device 80. The microcode update file may be in the form of data, for example, a font update, an update to a lookup table, etc., or may be in the form of a new executable program. The new executable program, referred to hereinafter as an executable, is in an object form (that is, the filename has the form "*.o") and can be any name. The executable preferably includes a procedure that allows the current microcode in the printer 10 to recognize the print job file 97 as a microcode update file including a new executable.

The microcode update file is configured as module body 105 and a corresponding module header 110 is constructed. The module header 110 and body 105 are placed in a print job file 97 as shown in step B. As mentioned above, the file header 100 of print job file 97 is constructed with information that identifies it as including a microcode update. The print job file is sent to the printer 10 in step C through any interface that is capable of receiving a print job file, preferably the I/O interface 75 (FIG. 2), and downloaded into volatile memory 55.

In step D the current microcode controlling the processor 50 in the printer 10 recognizes the print job file 97 as a microcode update.

If the microcode update file includes a new executable there is also an option available to allow the new executable to download the remainder of the print job file 97, wherein the current microcode passes the pointers to the remainder of the print job file 97 to the new executable once it has been downloaded and is running. This option is designated in the file header 100 of the print job file 97 in byte 248 (195 in FIG. 5). The option is defined by bits 0 and 1 of byte 248 and operates as follows:

As shown in step E, if bit 0=0, the option is not active, and all other bits are ignored. The print job file is recognized only as including a microcode update, and each module is treated as data. As such, each module is downloaded to volatile memory 55. As shown in step F, the modules are copied into the storage device 63 and directory 64 (and subdirectory 65 if specified) designated in the respective module header 110 by bytes 60–100 (230 in FIG. 7). A status page is printed (if not suppressed) including the upper and lower status page descriptors 145, 160 (see FIG. 6). As shown in step G, if no errors occur, the modules in volatile memory 55 are erased and the modules in the storage device 63 and directory 64 are renamed if required. The processor 50 then reboots.

As shown in step H, if bit 0=1, the option is active and the first module header 110$_1$ and body 105$_1$ are downloaded into volatile memory 55, and the contents of the first module body 105$_1$ are written into the storage area and directory 230 designated in the first module header 110$_1$. In step I the current microcode then loads the new executable from the storage device 63 and directory 64 into execution memory 57 through an operating system call that enables dynamic downloading of new executables to execution memory 57. By dynamic downloading it is meant that the new executable may be loaded as the next task while the processor is performing another task. The operating system call also records and registers the names of any procedure that may be included in the new executable so it can be utilized by the current microcode if required. The new executable contains fixed name procedure calls that allow the current microcode to identify those procedures newly included in the new executable, once the new executable has been loaded into execution memory 57. Once loaded, the processor 50 transfers execution to the newly loaded executable and waits for it to return.

As shown in step J, if bit 1=0, when the operation of the new executable returns, the current microcode resumes control of the processor 50, and the current microcode will download the remainder of the print job file 97. A status page is printed (if not suppressed) including the upper and lower status page descriptors 145, 160. If the download is successful, the new executable is erased from non-volatile memory and the processor 50 reboots.

As shown in step K, if bit 1=1, the new executable will download the rest of the print job file 97 during its operation. In this case the new executable preferably includes additional code to process the remainder of the print job file 97. At this point, the new executable may perform any function that is capable of being programmed, including writing new microcode to non-volatile memory and rebooting. However, if the new executable ends operations and the current microcode resumes control of the processor 50, a status page is printed (if not suppressed) including the upper and lower status page descriptors 145, 160, and if there are no errors, the new executable is erased from non-volatile memory and the processor 50 reboots.

Although described above in the context of specific computer peripherals, I/O interfaces, printer architectures, specific numbers of data fields, lengths of data fields, and specific arrangements of data fields in the print job file 97, and the various headers 100, 110 contained therein, those skilled in the art should appreciate that these are exemplary and indicative of presently preferred embodiments of these teachings, and are not intended to be read or construed in a limiting sense upon these teachings.

What is claimed is:

1. A method for a printer linked to a computing device to update microcode of said printer comprising the steps of:
   receiving from said computing device one or more files across an interface suitable for conveying information to be printed by said printer, wherein at least one of said files is a print job file comprising an embedded microcode module, said module being one of a plurality of modules in said print job file;
   recognizing if a received file is a print job file and if a received print job file comprises an embedded microcode module, else if a received print-job file does not include a microcode module, then normally processing said print-job file; and
   writing at least one microcode module received in a print job file to a memory area in said printer indicated in said print job file,
   wherein said print job file further comprises a single file header portion and a separate file data portion, and wherein presence of a microcode module in said print job file is indicated by a bit pattern in said file header portion of said print job file, wherein said module further comprises a module header and module data, wherein said module header comprises a data field for specifying a destination storage location for said module, and wherein said module header comprises a bit pattern that directs a processor in said printer to create a file specified by said data field, delete a file specified by said data field, create a directory specified by said data field, or delete a directory specified by said data field.

2. An apparatus for updating microcode comprising; a computing device comprising a program for composing and downloading a print job file;
   a printer comprising a printer processor, a printer memory having stored microcode, and a printing engine; and
   an interface linking said computing device and said printer and suitable for conveying information to be printed by said printer;
   wherein said program causes said computing device
     to compose a print job file having an embedded microcode module, and
     to download said composed print job file to said printer across said interface, and
   wherein said microcode controls said printer to receive from said computing device across said interface said print job file comprising an embedded microcode module,
   to recognize that said received print job file comprises an embedded microcode module, and
   to write said embedded microcode module to a memory area in said printer indicated in said print job file, and
   wherein said print job file further comprises a single print job file header and a separate print job file data, wherein presence of a microcode module in said print job file is indicated by a bit pattern in a header portion of said print job file, wherein said print job file further comprises a module comprising a module header and module body, wherein said module body comprises said microcode, and wherein said module header comprises a data field for specifying a destination storage location for said module, and wherein said module header comprises a bit pattern that directs said printer to create a file specified by said data field, to delete a file specified by said data field, to create a directory specified by said data field, or to delete a directory specified by said data field.

* * * * *